United States Patent [19]

Tobias

[11] 4,443,589

[45] Apr. 17, 1984

[54] ACRYLIC MODIFIED ANIONIC WATER DISPERSIBLE CELLULOSE ESTERS

[75] Inventor: Michael A. Tobias, Bridgewater, N.J.

[73] Assignee: Mobil Oil Corporation, New York, N.Y.

[21] Appl. No.: 297,281

[22] Filed: Aug. 28, 1981

[51] Int. Cl.$^3$ ............................ C08L 1/14; C08L 1/10
[52] U.S. Cl. .................................... 527/300; 527/311; 527/313; 527/314; 527/301; 525/329.7; 525/329.9; 525/330.2; 526/200; 526/238.21
[58] Field of Search .................. 526/238.21; 527/300, 527/311, 313, 314; 525/327.4, 329.7, 330.2, 330.3

[56] References Cited

U.S. PATENT DOCUMENTS

| | | | |
|---|---|---|---|
| 3,634,021 | 1/1972 | Bolinger et al. | 527/314 |
| 3,676,190 | 7/1972 | Landler et al. | 526/238.21 |
| 3,954,912 | 5/1976 | Werner et al. | 525/378 |
| 3,995,998 | 12/1976 | Rowland et al. | 527/314 |
| 4,268,641 | 5/1981 | Koenig et al. | 525/378 |
| 4,285,847 | 8/1981 | Ting | 260/29.2 EP |
| 4,324,708 | 4/1982 | Ito et al. | 527/314 |

FOREIGN PATENT DOCUMENTS

| | | | |
|---|---|---|---|
| 2542613 | 4/1976 | Fed. Rep. of Germany | 527/314 |
| 2305452 | 10/1976 | France | 527/314 |
| 56-6157463 | 12/1981 | Japan | 527/314 |
| 159656 | 2/1963 | U.S.S.R. | 527/314 |
| 444772 | 5/1975 | U.S.S.R. | 527/314 |

OTHER PUBLICATIONS

Hebeish, A., Guthrie, J. T., Chemistry and Technology of Cellulosic Copolymers, 1981, Springer-Verlag, Berlin, G. D. R., pp. 202–206.

Primary Examiner—John Kight, III
Assistant Examiner—Nathan M. Nutter
Attorney, Agent, or Firm—Alexander J. McKillop; Michael G. Gilman; Edward J. Trojnar

[57] ABSTRACT

This invention provides a graft copolymer of at least one acrylic monomer and a cellulose ester, in which at least about 8 percent of the total weight of said graft copolymer is derived from acrylic acid, methacrylic acid, or both. It also provides anionic aqueous dispersions of such graft copolymers and coating compositions containing them.

6 Claims, No Drawings

ACRYLIC MODIFIED ANIONIC WATER DISPERSIBLE CELLULOSE ESTERS

BACKGROUND OF THE INVENTION

1. Field of the Invention

This invention is concerned with acrylic modified cellulose esters.

2. Description of the Prior Art

Insofar as is now known, the polymers of this invention have not been proposed.

SUMMARY OF THE INVENTION

This invention provides a graft copolymer of at least one acrylic monomer and a cellulose ester, in which at least about 8 percent of the total weight of said graft copolymer is derived from acrylic acid, methacrylic acid, or both. It also provides anionic aqueous dispersions of such graft copolymers and coating compositions containing them.

DESCRIPTION OF SPECIFIC EMBODIMENTS

The main backbone chain of the graft copolymer of this invention is a cellulose ester. Although cellulose has been esterified with various aliphatic and aromatic carboxylic acids, the most usual and preferred are cellulose acetates, propionates, butyrates, and mixed esters, such as cellulose acetate propionate and cellulose acetate butyrate. The cellulose esters and their manufacture are discussed in Kirk-Othmer "Encyclopedia of Chemical Technology," Vol. 5, pages 118-129, John Wiley & Sons, Third Edition 1979, which is incorporated herein by reference. A variety of cellulose esters are commercially available.

The cellulose ester is grafted with at least one acrylic monomer. Various acrylic monomers and monomers copolymerizable therewith can be used. In order to provide sufficient free carboxyl groups to render the graft copolymer water dispersible, however, at least about 8 percent of its weight must be acrylic acid or methacrylic acid moieties. The acrylic monomers can all be acrylic acid or methacrylic acid or it can be a mixture of acrylic monomers or of acrylic monomers and other monomers polymerizable therewith, provided that sufficient acrylic or methacrylic acid is used to amount to at least about 8 percent of the total weight of the graft copolymer. Non-limiting examples of utilizable acrylic monomers are acrylic acid, methacrylic acid, methyl acrylate, methyl methacrylate, ethyl acrylate, ethyl methacrylate, propyl acrylate, propyl methacrylate, butyl acrylate, butyl methacrylate, hydroxyethyl acrylate, hydroxyethyl methacrylate, hydroxypropyl methacrylate, acrylonitrile, methyacrylonitrile acrylamide, methacrylamide, and monomers copolymerizable therewith, such as styrene, p-methylstyrene and lower monoolefins.

The graft copolymerization can be carried out by polymerizing the acrylic monomer or monomers in a solution of the cellulose ester backbone resin under free radical conditions. Typically, the monomer or monomers is dissolved in a suitable solvent, such as methyl ethyl ketone, methoxyethanol, ethoxyethanol, and the like. The free radical initiator can be, e.g., t-butyl perbenzoate or benzoyl peroxide. The temperature used is the activation temperature of the initiator.

In forming a coating composition containing the acidic graft copolymer resin, the resin is neutralized with a tertiary amine, ammonia, or ammonium hydroxide to a pH about 7.0 to about 9.0. Typical amines utilizable include triethylamine, tripropylamine, dimethylethanolamine, diethylethanolamine, dimethylethylamine, and methyldiethylamine.

In the finished coating composition, the resin solids content will be about 10 to about 40 weight percent. The volatile system (including amine, ammonia, or ammonium hydroxide) will be between about 90 weight percent and about 60 weight percent of the finished coating composition, preferably about 75-85 weight percent. About 65 to 90 weight percent of the volatile system will be water and the balance (35 to 10 weight percent) will be organic volatile solvents, including amine, ammonia, or ammonium hydroxide. Preferably, the ratio of water to organic volatiles will be about 70:30 to 80:20 in the volatile system. Each component of the solvent system will be present in between about one weight percent and about 20 weight percent of the weight of the final composition. A typical and preferred solvent system is defined in the working examples.

The coating composition will contain a crosslinking agent, such as an aminoplast or one of the well known diisocyanates such as tolylene diisocyanates. The preferred material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine; 2,4,6-trihydrazine-1,3,5-triazine, and 2,4,6-triethyltriamino-1,3,5-triazine. The mono-, di-, or triaryl or mono, di-, or triaryl melamines, for instance, 2,4,6-triphenyltriamino-1,3,5-triazine can be used. Also utilizable are benzoguanamine and hexamethoxymethyl melamine. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like. It is preferred to use an aminoplast that is water soluble. The amount of cross-linking agent used is generally between about 15 weight percent and about 40 weight percent, based on total resin solids.

The coating composition of this invention is primarily useful for coating aluminum, tin plated steel, pretreated metals, steel, and metals coated with the same or different resin composition (i.e., a second coat). The coating composition can be used, however, for coating other substrates such as wood, paper and leather. The most preferred and useful use of the coating composition is for coating of cans, coil stock, and fabricated metal. Coating can be done by any coating procedure well known to those skilled in the art including direct roll-coating, electrodeposition, spraying, flow coating and the like. After coating the substrate, the coating is baked for about 5 seconds to about one minute to about 30 minutes at between about 120° C. and about 260° C.

EXAMPLE 1

A two liter resin kettle was charged with 175.0 g. of Cellulose Acetate Butyrate (CAB-551-0.01) (2 wt. % acetyl; 53 wt. % butyryl; equiv. wt. 1065; M.R.

110°–125° C.; Tg 101° C.) and 125.0 g. of Cellosolve. It was heated to 110° C. under nitrogen at which time a solution of 50.0 g. of methacrylic acid, 50.0 g. of methyl methacrylate, 225.0 g. of butyl acrylate, and 23.0 g. of benzoyl peroxide was added dropwise over a three-hour period. The reaction mixture was held at 110° C. for one hour and then cooled to 90° C. whereupon 3.3 g. of additional benzoyl peroxide was added. After an additional hour at 90° C., 46.6 g. of dimethylethanolamine and 46.6 g. of deionized water were added. Subsequently, 948.4 g. of deionized water was added over a two-hour period. The resulting aqueous dispersion (pH=8.01, Brookfield viscosity=405 cps) was determined to contain 31.2 percent nonvolatile material (2 hrs. @ 150° C.).

EXAMPLE 2

A two-liter resin kettle was charged with 175.0 g. of Cellulose Acetate Butyrate (CAB-551-0.2) (2 wt. % acetyl; 53 wt. % butyryl; equiv. wt. 1065, M.R. 130°–140° C.; Tg 101° C.) and 125.0 g. of Cellosolve. It was heated to 110° C. under nitrogen at which time a solution to 50.0 g. of methacrylic acid, 50.0 g. of methyl methacrylate, 225.0 g. of butyl acrylate, and 23.0 g. of benzoyl peroxide was added dropwise over a three-hour period. The reaction mixture was held at 110° C. for one hour and then cooled to 90° C. whereupon 3.3 g. of additional benzoyl peroxide was added. After an additional hour at 90° C., 46.6 g. of dimethylethanolamine and 46.6 g. of deionized water were added. Subsequently, 1948.4 g. of deionized water was added. The resulting aqueous dispersion (pH=8.13, Brookfield viscosity=630 cps) was determined to contain 18.6 percent nonvolatile material (2 hrs. @ 150° C.).

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An aqueous coating composition comprising the neutralized graft copolymer composition prepared by
    polymerizing an acrylic monomer component comprising acrylic acid, methacrylic acid or both, in a solution which also comprises a solvent and a cellulose ester, under polymerization conditions in the presence of a free radical initiator selected from t-butyl perbenzoate and benzoyl peroxide, wherein said acrylic monomer component and said cellulose ester are employed in amounts sufficient to provide a graft copolymer composition having at least about 8 percent of its total weight derived from acrylic acid, methacrylic acid or both and sufficient to render said neutralized graft copolymer composition water dispersible;
    neutralizing the graft copolymer composition with ammonia, ammonium hydroxide or a tertiary amine; adding a cross-linking agent; and adding sufficient water to disperse the composition.
2. A composition according to claim 1 wherein said acrylic monomer component also comprises one or more monomers selected from methyl acrylate, methyl methacrylate, ethyl acrylate, ethyl methacrylate, propyl acrylate, propyl methacrylate, butyl acrylate, butyl methacrylate, hydroxyethyl acrylate, hydroxyethyl methacrylate, hydroxypropyl methacrylate, acrylonitrile, methylacrylonitrile acrylamide, methacrylamide, styrene, p-methylstyrene and lower monoolefins.
3. The composition of claim 2 wherein said cellulose ester contains 2 wt. % acetyl and 53 wt. % butyryl.
4. The composition of claim 3 wherein said acrylic monomer component comprises methacrylic acid, methyl methacrylate, and butyl acrylate.
5. A substrate coated with the coating composition of claim 1 and baked.
6. A coated substrate of claim 5 wherein said substrate is a metal substrate.

* * * * *